May 19, 1953 — C. J. YOUNG — 2,639,322
FACSIMILE SCANNER
Filed Oct. 30, 1948 — 4 Sheets-Sheet 1

INVENTOR
Charles J. Young
ATTORNEY

May 19, 1953 — C. J. YOUNG — 2,639,322
FACSIMILE SCANNER
Filed Oct. 30, 1948 — 4 Sheets-Sheet 2

INVENTOR
Charles J. Young
BY
ATTORNEY

May 19, 1953
C. J. YOUNG
2,639,322
FACSIMILE SCANNER
Filed Oct. 30, 1948
4 Sheets-Sheet 3
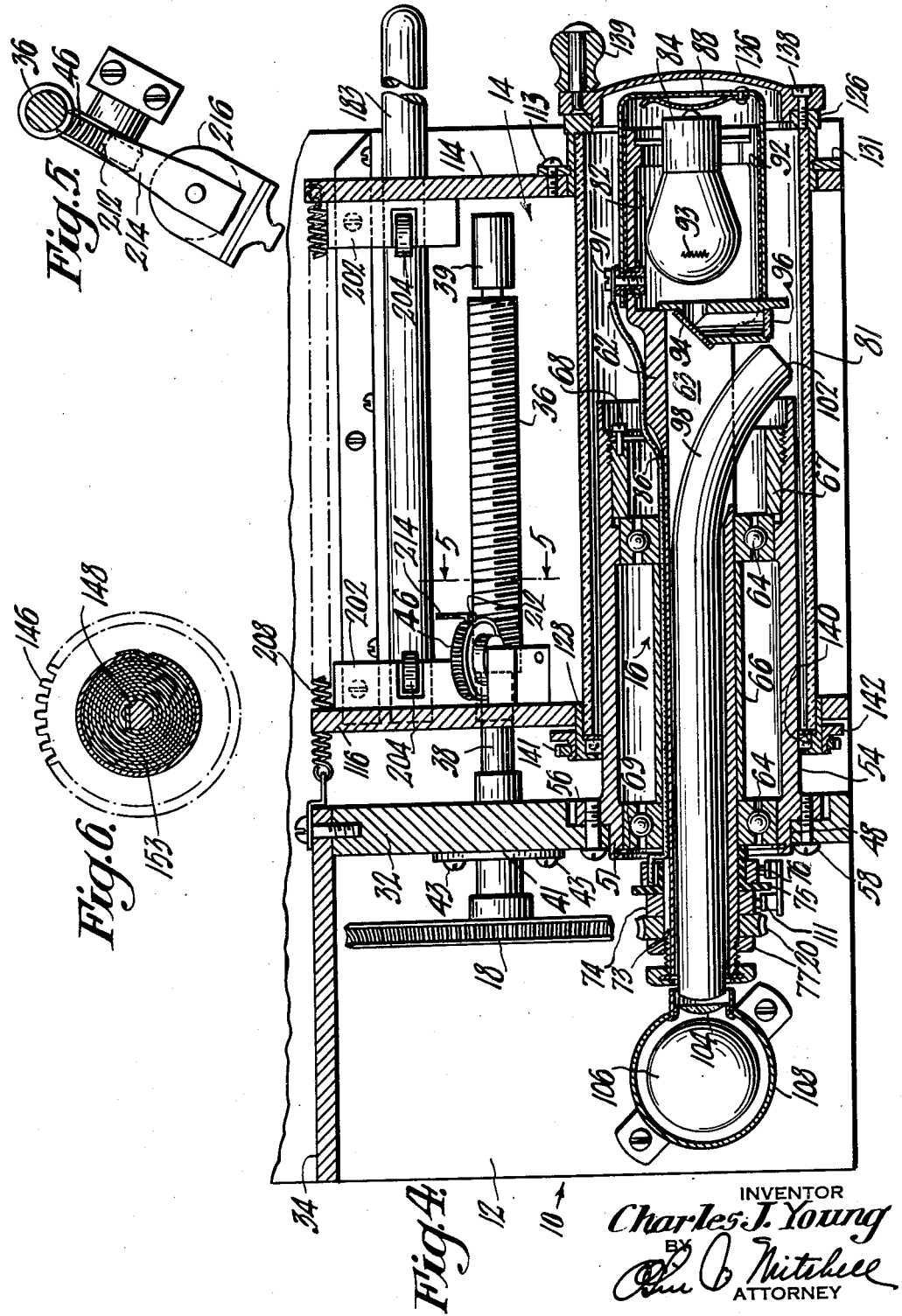
INVENTOR
Charles J. Young
BY
ATTORNEY

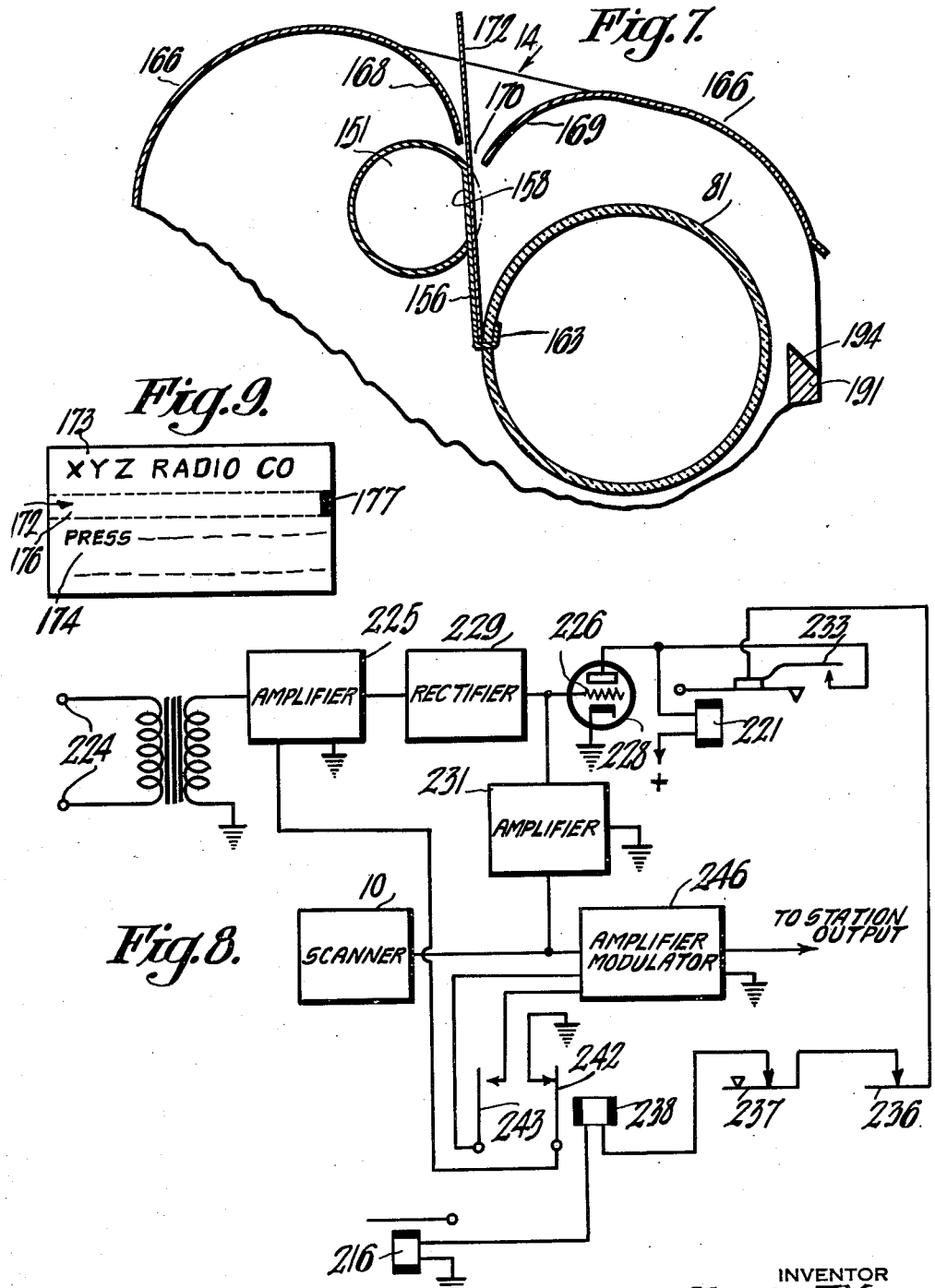

Patented May 19, 1953

2,639,322

UNITED STATES PATENT OFFICE 2,639,322

FACSIMILE SCANNER

Charles J. Young, Princeton, N. J., assignor to Radio Corporation of America, a corporation of Delaware Application October 30, 1948, Serial No. 57,606

4 Claims. (Cl. 178—7.1)

The present invention relates to the transmission of messages, pictures and other subject matter in facsimile, and more particularly, but not necessarily exclusively, to a novel facsimile scanner which accepts, scans and ejects discrete pieces of subject copy such, for example, as message sheets bearing inscriptions or other subject matter to be reproduced in facsimile at a more or less remote point. While the illustrative embodiment of the invention is particularly adapted for scanning such matter for transmission, it will be understood that numerous features of the invention may be incorporated in a facsimile recorder.

In accordance with the invention, a compact scanner is provided which has a stationary copy holder, for example, a stationary transparent drum, within which there is a revolvable mechanism for projecting an exploring point or spot of light on the subject copy which is tightly held against the outer periphery of the transparent cylinder. The transparent cylinder is supported from or on a movable carriage and means are provided for advancing the movable carriage and with it the transparent cylinder axially of its length by a correlated feed mechanism. The exploring point may be moved with respect to the cylinder when using certain features of the invention. Means are provided in accordance with the invention for making the cylinder dust tight. Subject copy, in the form of a message sheet, for example, is loaded into the scanner by flexible means, such for example as a flexible curtain, which is secured at one end to the transparent cylinder so that it can be wrapped around the cylinder as it is unwound from a roller adjacent to the cylinder. The cylinder and roller are preferably mechanically coupled together and the roller is constructed in accordance with the invention to permit introduction of a message sheet only when the parts are in an appropriate position. When the transparent cylinder is rotated in the direction opposite in which it is turned for acceptance of subject copy, the subject copy is automatically discharged from the scanner. Moreover, in accordance with the invention, novel means are provided for phasing the scanner with a more or less distant recorder. This is accomplished in the illustrative embodiment by reversing the direction of rotation of the transparent cylinder after a piece of subject copy is loaded thereon until phasing occurs. The manner in which phasing is obtained and also the manner in which its occurrence is indicated to the operator of the scanner are important features of the present invention.

Accordingly, it will be seen from the foregoing that the principal object of this invention is to provide a novel facsimile scanner which is compact and which may readily be operated by the manipulation of simple controls.

Another object is to provide novel phasing means for a facsimile scanner.

A further object is to provide a scanner having novel means for projecting an exploring point onto a piece of subject matter and providing for relative movement of the subject matter and the point in a manner to produce line by line scanning.

Other objects and advantages of the present invention will, of course, become apparent and immediately suggest themselves to those skilled in the art to which the invention is directed from a reading of the following specification in connection with the accompanying drawing in which:

Fig. 4 is a horizontal sectional view taken on line 4—4 of Fig. 3;

Fig. 5 is a fragmentary sectional view taken on line 5—5 of Fig. 4;

Fig. 6 is a frogmentary vertical sectional view taken on line 6—6 of Fig. 1;

Fig. 7 is a diagrammatic fragmentary sectional view similar to Fig. 3 but including a showing of parts omitted in Fig. 3;

Fig. 8 is a schematic diagram of a facsimile transmitting station embodying electrical circuits of the invention; and Fig. 9 shows a message sheet suitable for use with the apparatus of Fig. 1.

Figure 1:
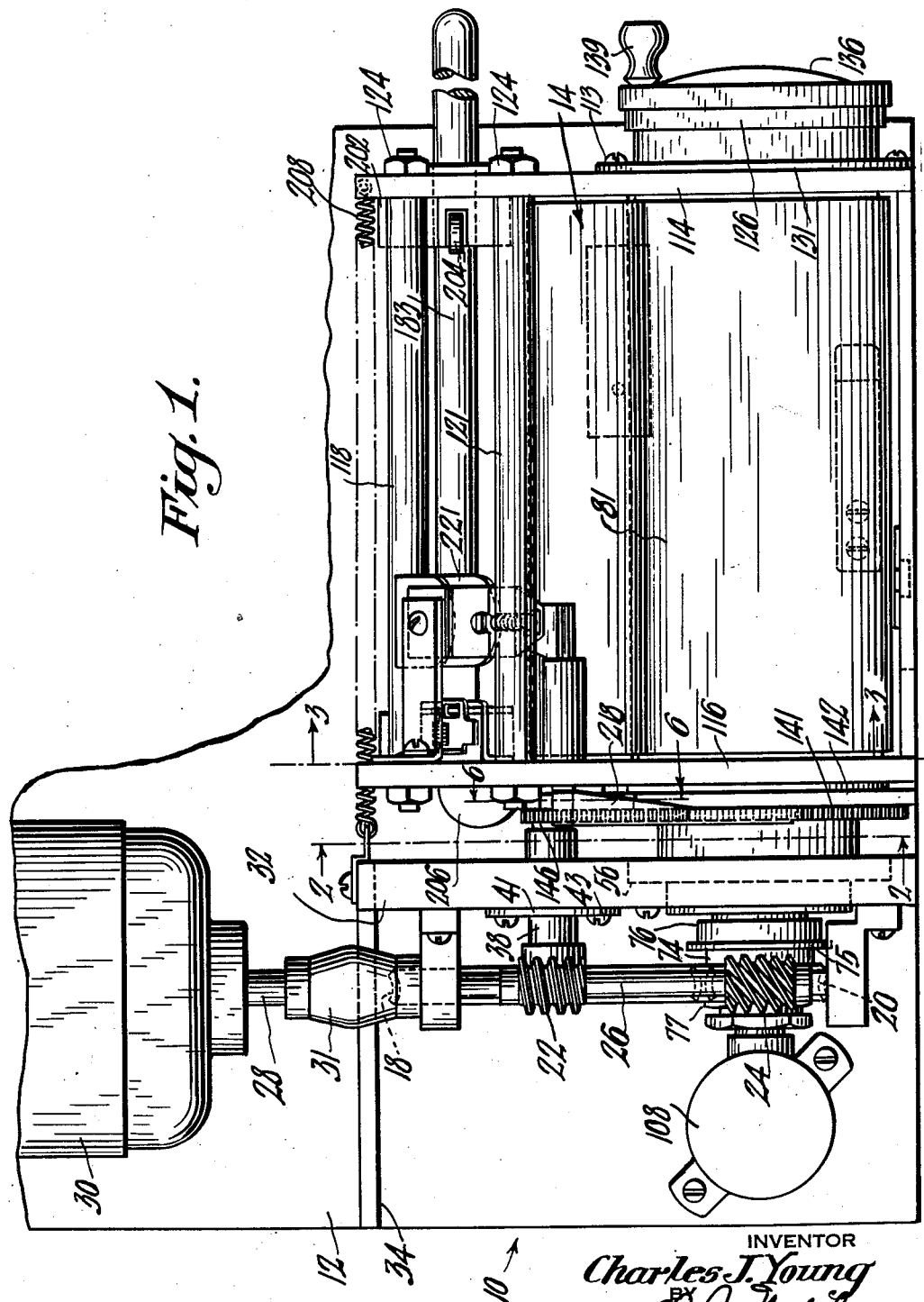
Fig. 1 is a top plan view of facsimile apparatus embodying the invention.

Referring to the drawing, the facsimile apparatus embodying the invention is indicated in its entirety by reference character 10. This apparatus is in the form of a scanner for producing image signals from a piece of subject copy and, as will appear hereinafter, the initiation and termination of the production of these signals are features of this invention. The scanner 10 is composed generally of a stationary part which includes a base 12; a movable carriage 14 incorporating means for receiving, holding, and ejecting subject copy to be scanned; and a rotatable mechanism 16 having means for tracing a scanning path on subject copy by a spot of light.

Movement of the carriage and rotation of the mechanism 16 are correlated to effect tracing of a helical scanning path on the subject copy which is bent and held substantially in cylindrical form during the operation of the scanner. The carriage movement and rotation of the light scanning spot are correlated respectively by worm wheels 18 and 20 driven by worms 22 and 24 (Fig. 1). The worms 22 and 24 are driven through the instrumentality of shaft 26 which is coupled to the motor shaft 28 of a motor 30. In the illustrative example the shaft 26 directly carries the worms 22 and 24 and is coupled directly to the motor shaft by a suitable flexible coupling 31.

The motor 30 may be of the synchronous type which is supplied from a commercially available power source or a source of standard frequency, such for an example, as a tuning fork oscillator. The remote recorder or recorders may be maintained in synchronism with the transmitter by connecting them to the same commercial power source. The recorder or recorders may also be driven from a frequency regulated power supply. It will be understood, however, that other well-known means of synchronizing facsimile equipment may be employed, such for instance by the transmission and reception of a special synchronizing signal. The apparatus disclosed herein and embodying the present invention is receptive to a phasing signal which is or may be generated by a remote receiver operating in conjunction with a scanner of this invention when it is employed for generating facsimile signals for transmission. The manner in which the apparatus disclosed herein is responsive and operates in accordance with a phase signal will be described hereinafter. A copending application of the present inventor, Serial No. 57,605, filed October 30, 1948, now Patent No. 2,538,547, granted January 16, 1951, discloses and claims a facsimile system in which a transmitter embodying features of the present invention may be employed to generate image signals representing scanned subject copy. Features and details of a transmitting office and a receiving office are shown in the aforementioned Patent No. 2,538,547.

The base 12 of the machine 10 is or may be suitably arranged so that it can rest on an instrument table or the like (not shown) and it has an upright supporting plate or frame member 32 secured thereon. An upright plate 34 secured in any suitable manner to the base 12 serves as a brace for the upright frame part 32. The previously mentioned movable carriage 14 is propelled axially of the rotating mechanism 16 by means of a lead screw 36 which is formed on a shaft 38, the latter being journalled at one end in an upright bearing bracket 39. The bearing bracket 39 is secured in any suitable manner to the base 12. The end of the lead screw shaft 38 projects through and is journalled in a bearing member 41 secured to the upright member 32 by suitable means such as the screws 43. The previously mentioned worm wheel 18 is secured to the end of the shaft 38. A worm wheel 46, mounted on the carriage 14, cooperates with the lead screw 36 to move the carriage when rotation of the worm wheel is prevented in a manner to be described.

The upright frame member 32 is apertured and counterbored as indicated at 48 (Fig. 4) to receive the end 51 of a tubular member 54. The tubular member has a flange 56 thereon which sets within the counterbore and is secured in position by suitable fastening means such as screws 58.

The previously mentioned rotatable mechanism 16 comprises an elongated member 62 having a bore 63. This hollow member is rotatably mounted within the tubular member 54 on ball bearings 64. A spacer sleeve 66 fits over the member 62 between the inner races of the ball bearings 64. A circular lock nut 67 having a split portion which may be clamped by suitable means such as a screw 68 maintains the ball bearings 64 in position. A snap ring 69 engages the outer race of the ball bearing 64 which is within or adjacent to the upright frame member 32. The previously mentioned worm wheel 20 is mounted on the member 62 and is constrained to rotate with the member by suitable means, such as a key 73. The key 73 may also engage suitable key ways in a slip ring 74 and an insulating bushing 75. The key and key ways may be omitted provided that the worm wheel, slip ring, and insulating bushing are held tightly by a clamping nut 77. The bushing 75 carries a second slip ring 76. Suitable means such as the previously mentioned nut 77 clamps the assembly in place which includes the worm wheel, the slip ring 69 and the insulating bushing 75.

The rotary member 62 carries the optical system of the scanner which projects an exploring spot or scanning spot of light on subject copy encircling a transparent cylindrical member 81. Details of mounting and manipulation of the latter will be discussed hereinafter. An enlarged hollow portion 82 at the end of the rotatable member 62 accommodates a lamp 84 which is electrically connected to the slip ring 76 by means of a conductor 86. The enlarged portion 82 is provided with a cover 88. This cover is conveniently secured in a detachable manner to the portion 82 by means of a bayonet joint. The conductor 86 engages a binding position 91 which is insulated from the part 62. The cover 88 is also insulated from the part 62 by means of insulating sleeve 92. Light from the filamentary source 93 is projected by means of a mirror 94 through a lens 96 onto the subject copy. A light transmitting rod 98 of methyl methacrylate or other suitable light transmitting material has its end 102 exposed to collect light from the illuminated spot on the subject copy. Lens 104 collects this light from the other end of the rod 98 and projects it on the light sensitive element or elements of a phototube 106 housed within a shielding can or the like 108. The lens 104 is preferably cylindrical with its axis parallel to the axis of the light receiving element of the phototube. Suitable connections are made to brushes at 111 for energizing the lamp 84.

The output of the phototube 106 which is preferably of the electron multiplier type may be connected in any suitable manner, for example as shown in Fig. 8, to an outgoing line for the transmission of image signals to a more or less remote recorder or recorders. A type 931A phototube may be employed.

The movable carriage 14 is constructed with a pair of end frame members 114 and 116. These members are connected by tie rods (Fig. 1) 118 and 121. These tie rods have shouldered ends and are reduced and threaded to receive the clamping nuts 124.

The transparent cylinder 81 is constructed of a suitable transparent plastic such as methyl methacrylate. This cylinder is provided with end members 126 and 128. The end member 126 tightly receives one end of the cylinder 81 and is provided with a circular groove to receive the inner edge of a guiding or locating washer 131. The latter is preferably of two parts so that it may readily be secured in any suitable manner to the frame member 114, for example, by screws 113, one of which appears in Fig. 4 of the drawing. The end member 126 receives a cover member 136 which is secured in place by screws 138 and has a hand crank 139 secured thereon. Manipulation of the crank will rotate the transparent cylinder 81 and the parts connected thereto. The cover member 128 also receives the transparent cylinder 81 at the opposite end with a snug fit and it carries a gear 141 which is secured to a gear-carrying ring 142. The gear 141 meshes with a pinion 146 (Figs. 1 and 2) which is secured on a shaft 148. A dust seal 140 is provided. This shaft is suitably journalled in the end frame members 114 and 116 and carries a roller 151. In a preferred arrangement, the roller 151 is provided with stub shafts seated therein which project through the frame members. One of these stub shafts corresponds fully in function to the shaft 148 and carries the pinion 146. A rotary tensioning spring 153, similar in operation to the main spring of a clock, causes the roller 151 to be urged in a counter-clockwise direction as viewed in Fig. 3 of the drawings. A flexible curtain 156 is anchored along a flattened portion 158 of the roller by suitable securing means such as a flat strip 159 engaged by axially spaced screws 161. The curtain, as best shown in Fig. 7 of the drawings, is anchored along the transparent cylinder 81 by a suitable elongated clamping means 163.

Figure 3:
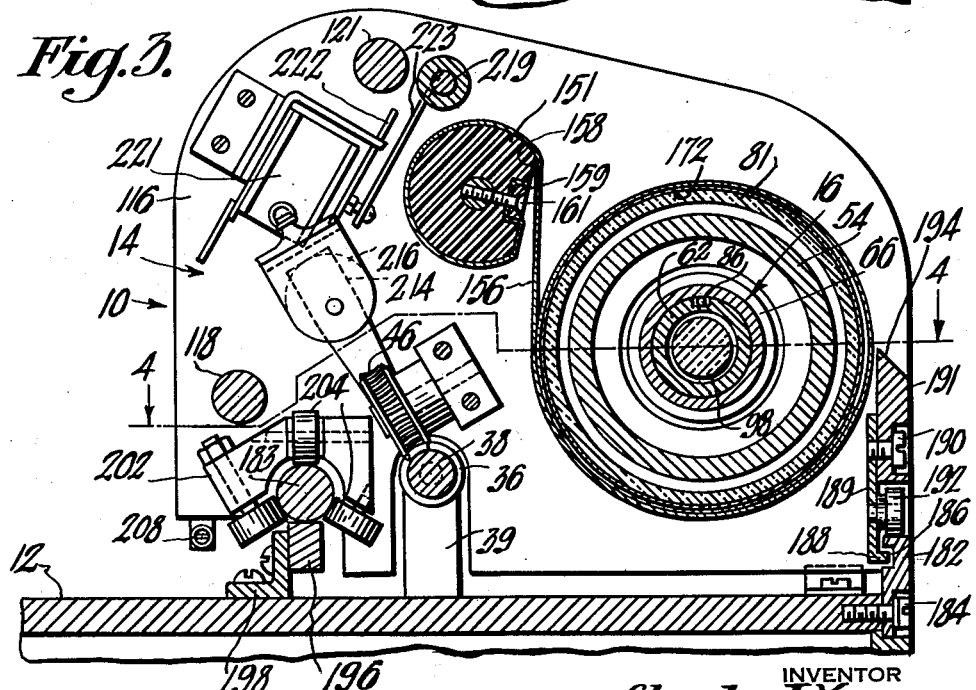
Fig. 3 is a vertical sectional view taken on line 3—3 of Fig. 1, certain of the parts of the apparatus being omitted for the sake of convenience of illustration.

From the parts thus far described, it will be seen that as the crank 139 is turned to impart counter-clockwise rotation to the cylinder 81, as viewed in Fig. 3 of the drawing, the curtain 156 will be wound on the cylinder 81. Fig. 7 of the drawings discloses clearly the principal functions of the roller, cylinder and the curtain together with the special cooperation of the cover member for the carriage. The cover member is given reference character 166 and is formed so as to provide inwardly bent portions in the form of flaps 168 and 169. The slot 170 so provided extends longitudinally of the carriage and is sufficiently long to accommodate sheets bearing subject copy. For example, in Fig. 9 there is illustrated by way of example, a suitable message sheet 172 upon which subject matter may be inscribed for transmission. The upper part 173 of this sheet may bear printed indicia and the lower portion 174 is available for inscription of a desired message or other subject matter. A strip 176 is reserved on the sheet and adjacent one edge there is a non-light reflective mark 177 to provide a phasing signal for comparison with a phasing signal received from a more or less distant recorder in accordance with the invention.

Fig. 7 indicates the position of the parts when the cylinder 81 and the curtain 156 is ready to receive a message sheet 172. This sheet is introduced into the slot 170 which is facilitated and permitted by the previously mentioned flattened portion 158 of the roller 151. When the sheet 172 has been introduced into the slot the cylinder is turned by the crank 139 in a counter-clockwise direction as viewed in Fig. 7 of the drawing until the curtain 56 is completely wound on the cylinder 81. The direction of rotation of the cylinder 81 is then reversed and turning in the reversed direction is continued until a phasing signal is received from a more or less distant recorder in a manner to be described in connection with the diagrammatic showing of Fig. 8 of the drawings.

The carriage 14 comprised of the carriage parts heretofore described travels upon rails 182 and 183 (Fig. 3). The rail 182 is secured to the base 12 by suitable means such as screws 184 and includes a groove 186 which is engaged by tongue 188 formed at the end of a roller carrying bracket 189. This bracket is secured to the front rail 191 of the carriage by means of a screw 190 and carries a roller 192 journalled thereon in a suitable manner. The front rail 91 of the carriage has a sloping top 194 which serves to project a message sheet 172 when the cylinder 81 is rotated in a clockwise direction as viewed in Fig. 3 of the drawings. The previously mentioned cover 166 ends short of the sloping top 194 to assist in accomplishing this purpose.

The rail 183 is cylindrical in form and is secured to a bracket and bar combination 196 and 198 which are in turn secured as a unit to the base 12. Bracket members 202 are secured to the carriage end frames 114 and 116, respectively, and they carry rollers 204 which embrace this rail. The circular rail 183 projects sufficiently to the right as indicated on Figs. 1 and 4 of the drawings to provide for ample carriage travel. A buffer or bumper member 206 (Fig. 1) permits travel of the carriage when it is released after a scanning operation. A spring 208 urges the carriage to the left as viewed in Fig. 1 of the drawings so as to return it to a position for a successive scanning operation.

The previously mentioned worm wheel 46 which is in mesh with the rotatable lead screw 36 may be latched against rotation by the tongue 212 formed at the end of the armature 214 of a magnet 216 (Figs. 3, 4 and 5). The worm wheel 212, therefore, serves in place of the usual half nut.

Figure 2:
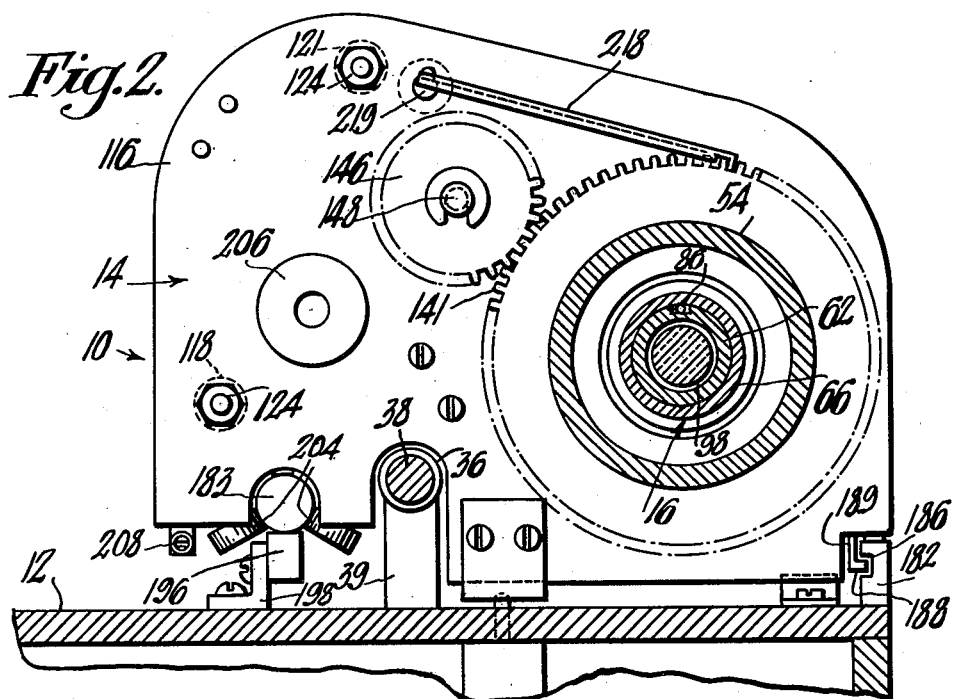
Fig. 2 is a vertical sectional view taken on line 2—2 of Fig. 1.

The cylinder 81 is locked against rotation by means of a swingable arm 218 which is secured to a rock shaft 219 (Fig. 2). The end of this arm 218 is formed to fit over the teeth of the gear 141 which is constrained to rotate with the cylinder 81. The shaft 219 is rocked to the locking position of the arm 218 by means of a magnet 221 (Fig. 3), the armature 222 of which is connected to an arm 223 also secured to the rock shaft 219.

Operation of the scanner 10 will now be described with reference to Fig. 8 of the drawings disclosing diagrammatically the system in accordance with the invention for operation of the scanner 10 in conjunction with a more or less distant recorder. Referring to Fig. 8, station terminals 224 are indicated diagrammatically to which connection may be made to an outgoing wire line or to a radio transmitter for example. As described and claimed in applicant's copending application, Serial No. 57,604, filed October 30, 1948, now Patent No. 2,581,616 granted January 8, 1952, and also in applicant's Patent No. 2,538,547 above referred to, a recorder (not shown) is provided which generates a phasing signal for each line of scanning traverse of the mechanism. This signal which appears as a pulse is amplified in an amplifier 225 and is applied to the grid 226 of an electron discharge tube 228 after rectification by a suitable rectifier 229. The pulse generated by the recorder will usually be transmitted as a modulation of a subcarrier so that the rectifier 229 serves as a demodulator for obtaining the pulse. The grid 226 of the tube 228 is also suitably connected in such a manner as to cut off the tube 228 when the scanner is generating facsimile signals in response to traversal of a light reflective area of the message sheet 172. A schematic connection for accomplishing this is shown in Fig. 8 of the drawing and is indicated by reference character 231. It will, therefore, be seen that the magnet 221 will not be energized by tube conductivity until the scanning exploring point of the scanner encounters a non-reflective portion of the message sheet. This non-reflective portion is provided in a convenient manner by the mark 177 on the message sheet of 172 of Fig. 9. It will, therefore, be seen that when the exploring point of the scanner encounters the spot 177 in unison with the reception of a phasing pulse from the recorder that the tube will be energized to energize magnet 221. This will swing the arm 218 so that its end engages and locks the gear 141 and hence the transparent cylinder 81. Energization of the magnet 221 closes contacts 233 which energizes a circuit including switches 236, 237, operating winding of a relay 238, and the magnet 216 which serves as a half nut magnet. The contacts 233 also lock the relay. The switch 236, for example, may be a micro switch (not shown) which is engaged by carriage 14 when it has completed its scanning traversal to the right as viewed in Fig. 1 or 4 of the drawings. The switch 237 may be a normally closed key or push button switch to interrupt scanning traversal of the carriage 14 at any desired instant. A tongue and break contact 242 of this same relay renders the amplifier 225 inoperative. A third tongue and make contact 243 of the relay 238 renders an amplifier modulator 246 operative so that image modulated signals are supplied to the station output, for example, the terminals 224 of Fig. 8.

What is claimed is:

1. A transmitting station for a communication system comprising transmitting equipment, means responsive to a signal generated by said equipment to delay operation of said equipment, means for deriving a control signal, said means being responsive to a signal received at said transmitting station, means for applying said derived control signal in coincidental relationship with the signal generated by said transmitter to said operation delaying means, and means to cause operation of said transmitter equipment upon the occurrence of coincidental application of said signals.

2. A transmitting station for a communication system comprising transmitting equipment, said transmitting equipment having means to develop a signal having a maximum and a minimum amplitude, means responsive to the maximum and minimum amplitudes of the signal generated by said equipment to delay operation of said equipment, means for deriving a control signal, said means being responsive to a signal received at said transmitting station, means for applying said derived control signal with the signal generated by said transmitter to said operation delaying means, and means to cause operation of said transmitter equipment upon the occurrence of coincidental application of said control signals and said signals generated by said equipment at one amplitude level.

3. A transmitting station for a communication system comprising transmitting equipment, said transmitting equipment having a movable part, said transmitting equipment having means to develop a signal having a maximum and a minimum amplitude depending upon the position of said movable part, means responsive to the maximum and minimum amplitude of the signal generated by said equipment to delay operation of said equipment, means for deriving a control signal, said means being responsive to a signal received at said transmitting station, means for applying said derived control with the signal generated by said transmitter to said operation delaying means, and means to cause operation of said transmitter equipment upon the occurrence of coincidental application of said control signals and said signals generated by said equipment at one amplitude level.

4. A transmitting station for a communication system comprising transmitting equipment, a discharge tube having at least a control electrode, an anode and a cathode, means for delaying operation of said transmitting equipment coupled to said anode, said transmitting equipment having means to develop a signal having a maximum and a minimum amplitude level, means to supply said signal to said control electrode, means for deriving a control signal, said means being responsive to a signal received at said transmitting station, and means for applying said derived signal to said control electrode, said operation delaying means thereby becoming operative upon coincidental occurrence of a signal of one amplitude level with a derived control signal.

CHARLES J. YOUNG.

References Cited in the file of this patent

UNITED STATES PATENTS

| Number | Name | Date |
|---|---|---|
| 2,019,864 | Lemmon | Nov. 5, 1935 |
| 2,255,868 | Wise et al. | Sept. 16, 1941 |
| 2,256,364 | Thompson | Sept. 16, 1941 |
| 2,302,827 | Wise et al. | Nov. 24, 1942 |
| 2,372,774 | Finch | Apr. 3, 1945 |
| 2,413,400 | Young | Dec. 31, 1946 |
| 2,435,250 | Tandler et al. | Feb. 3, 1948 |
| 2,464,618 | Shonnard et al. | Mar. 15, 1949 |
| 2,466,221 | Finch | Apr. 5, 1949 |
| 2,483,449 | Wise et al. | Oct. 4, 1949 |
| 2,538,547 | Young | Jan. 16, 1951 |